(12) United States Patent
Ellenwood et al.

(10) Patent No.: US 8,703,337 B2
(45) Date of Patent: Apr. 22, 2014

(54) HIGH DENSITY CATHODE MATERIALS FOR SECONDARY BATTERIES

(75) Inventors: Robert Ellenwood, Sherwood Park (CA); Jens Martin Paulsen, Daejeon (KR); JaeRyoung Lee, Cheonan (KR)

(73) Assignee: Umicore, Brussels (BE)

( * ) Notice: Subject to any disclaimer, the term of this patent is extended or adjusted under 35 U.S.C. 154(b) by 78 days.

(21) Appl. No.: 13/303,349

(22) Filed: Nov. 23, 2011

(65) Prior Publication Data
US 2012/0183858 A1 Jul. 19, 2012

Related U.S. Application Data

(63) Continuation-in-part of application No. PCT/EP2010/003096, filed on May 19, 2010.

(60) Provisional application No. 61/435,044, filed on Jan. 21, 2011, provisional application No. 61/184,441, filed on Jun. 5, 2009.

(30) Foreign Application Priority Data

Jun. 5, 2009 (EP) .................................... 09007465

(51) Int. Cl.
*H01M 4/525* (2010.01)
*C01G 51/04* (2006.01)

(52) U.S. Cl.
USPC .................. 429/231.3; 429/231.5; 429/213.6; 423/594.6

(58) Field of Classification Search
USPC .............. 429/231.3, 231.5, 231.6; 423/594.5, 423/594.6
See application file for complete search history.

(56) References Cited

U.S. PATENT DOCUMENTS

| | | | |
|---|---|---|---|
| 6,277,521 B1 | 8/2001 | Gao et al. | |
| 7,642,014 B2 * | 1/2010 | Morishima et al. | 429/231.3 X |
| 8,021,786 B2 * | 9/2011 | Kaiduka et al. | 429/231.3 |
| 2007/0264573 A1 | 11/2007 | Yamada et al. | |
| 2011/0049420 A1 * | 3/2011 | Ellenwood et al. | 252/182.1 |

FOREIGN PATENT DOCUMENTS

| | | |
|---|---|---|
| CN | 1982219 | 6/2007 |
| CN | 101279771 | 10/2008 |
| WO | WO 2009/003573 | 1/2009 |
| WO | WO 2009/074311 | 6/2009 |

OTHER PUBLICATIONS

International Search Report, issued in PCT/EP2010/003096, dated Aug. 31, 2010.
International Preliminary Report on Patentability, issued in PCT/EP2010/003096, dated Oct. 6, 2011.

* cited by examiner

*Primary Examiner* — Stephen J. Kalafut
(74) *Attorney, Agent, or Firm* — Brinks Gilson & Lione

(57) ABSTRACT

A lithium cobalt oxide powder for use as an active positive electrode material in lithium-ion batteries, the lithium cobalt oxide powder having a Ti content of between 0.1 and 0.25 mol %, and the lithium cobalt oxide powder having a density PD in g/cm$^3$ dependent on the powder particle size expressed by the D50 value in μm,
wherein PD≥3.63+[0.0153*(D50−17)].

4 Claims, 10 Drawing Sheets

Figures 1A, 1B:
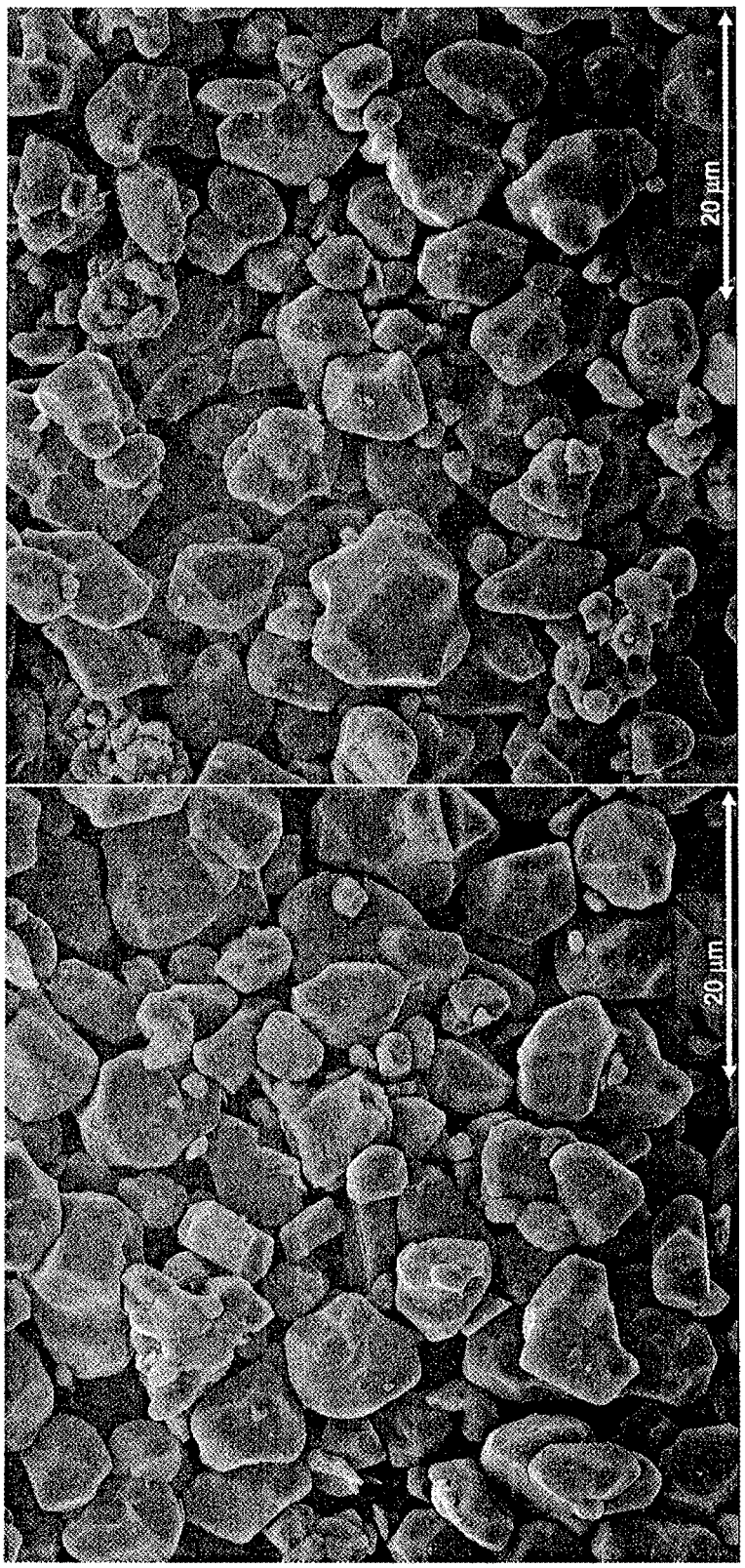

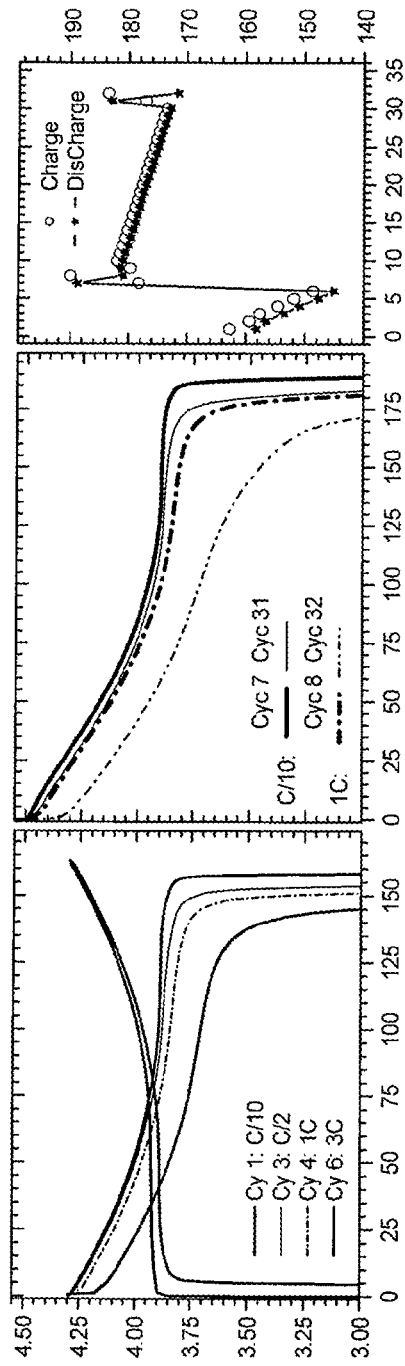
Figure 4)
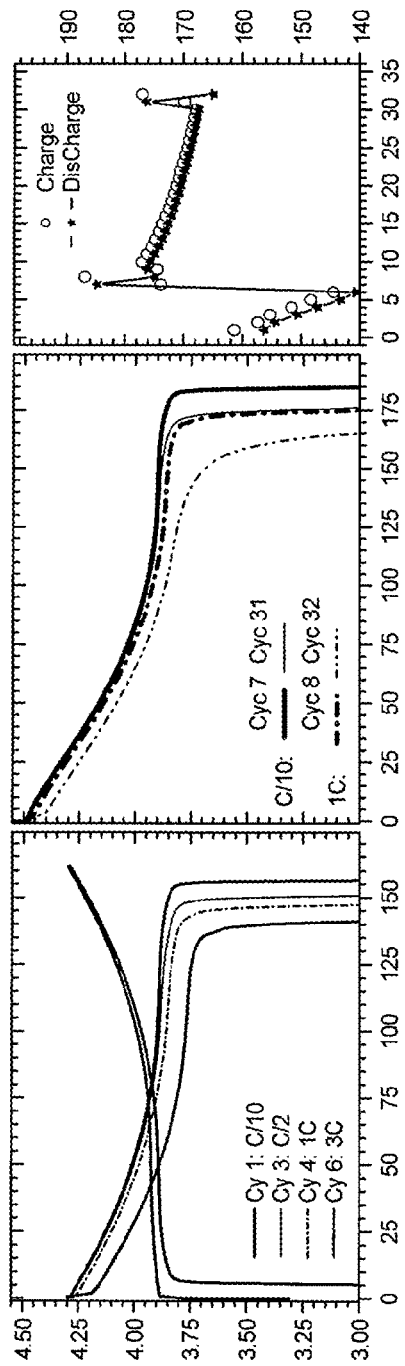
Figure 5)

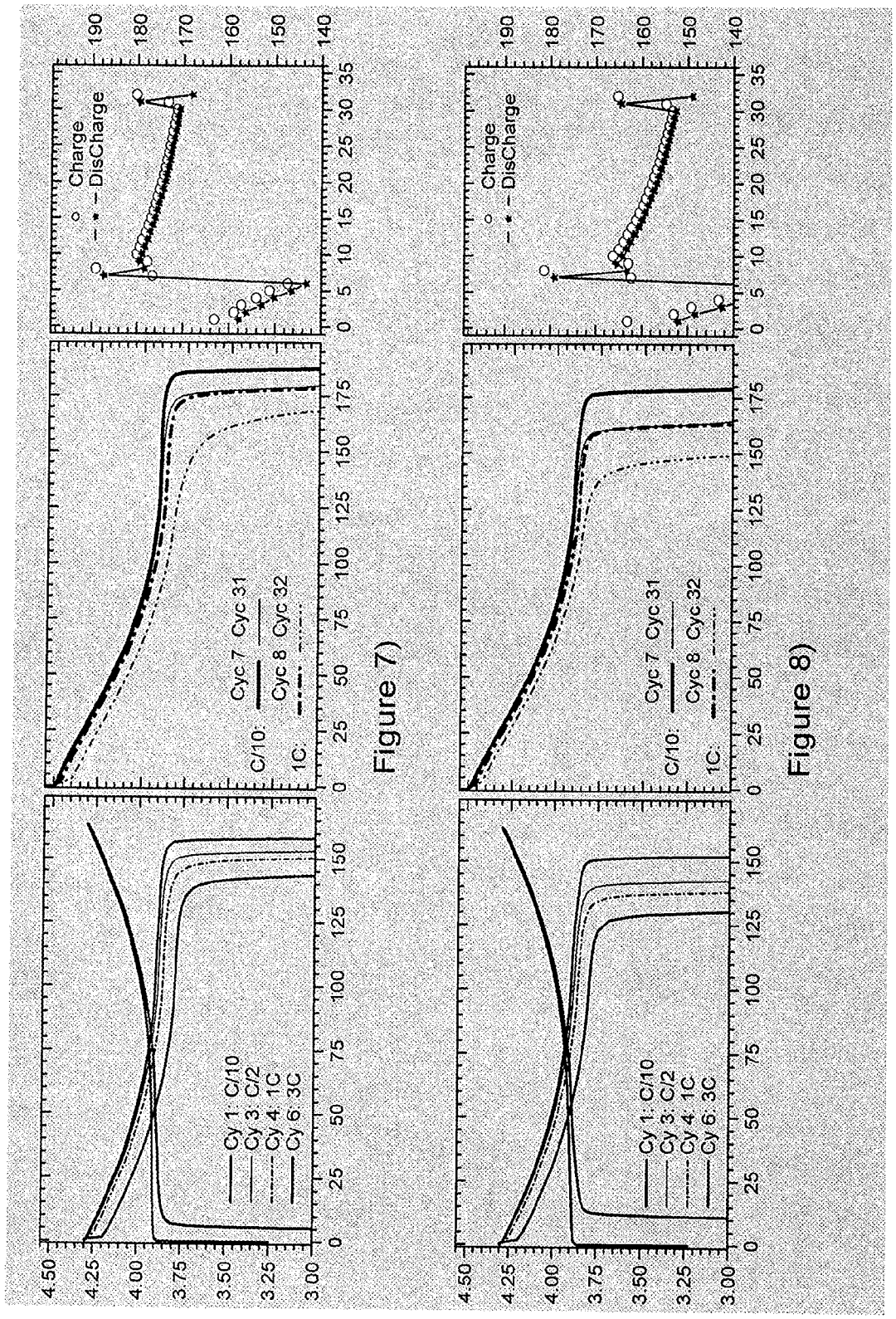

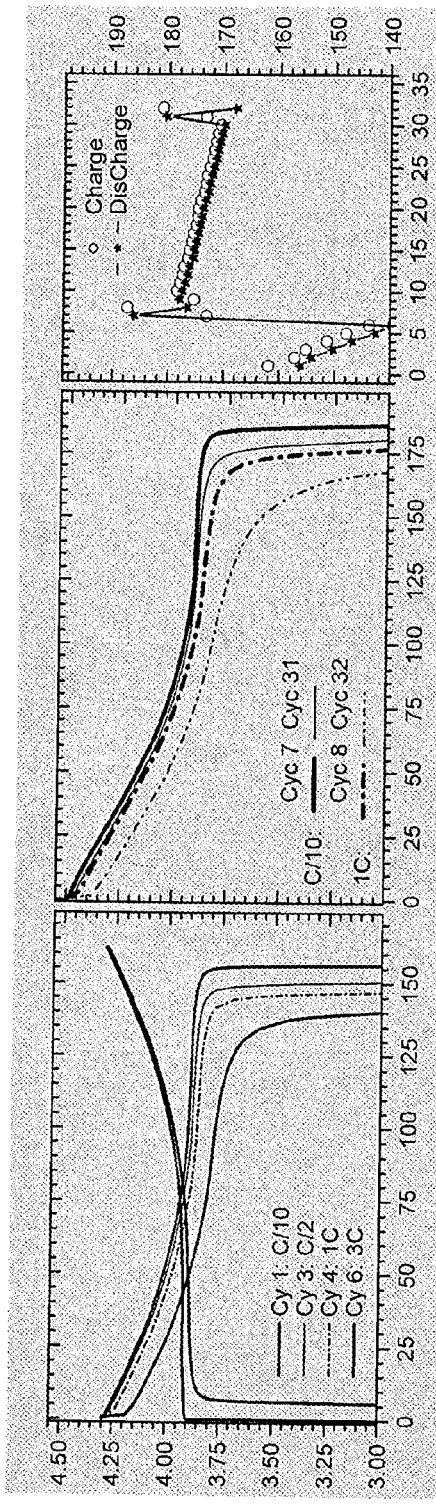
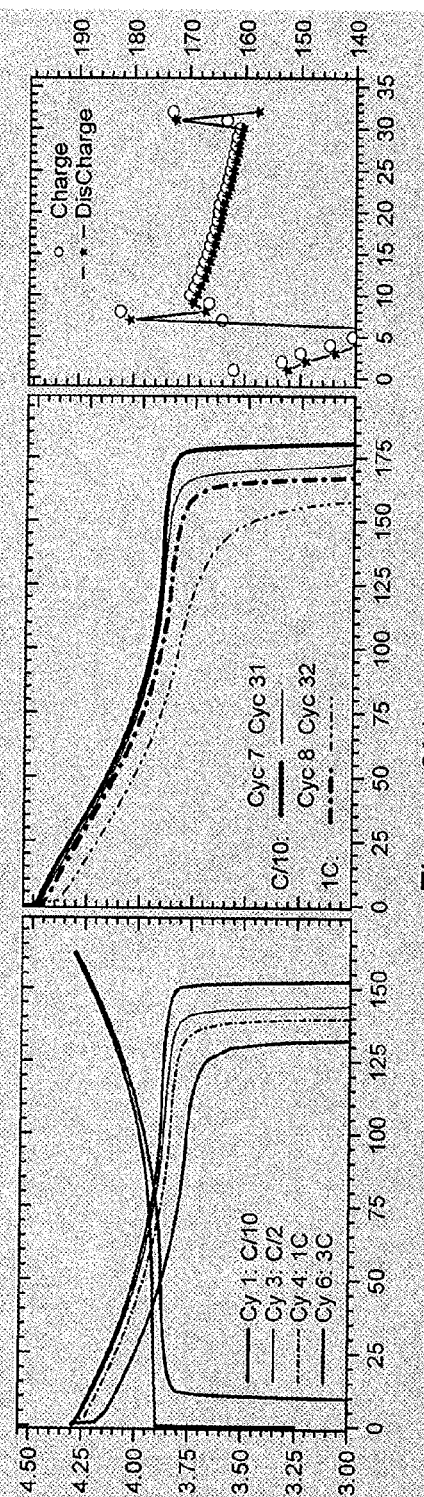
Figure 9a)
Figure 9b)

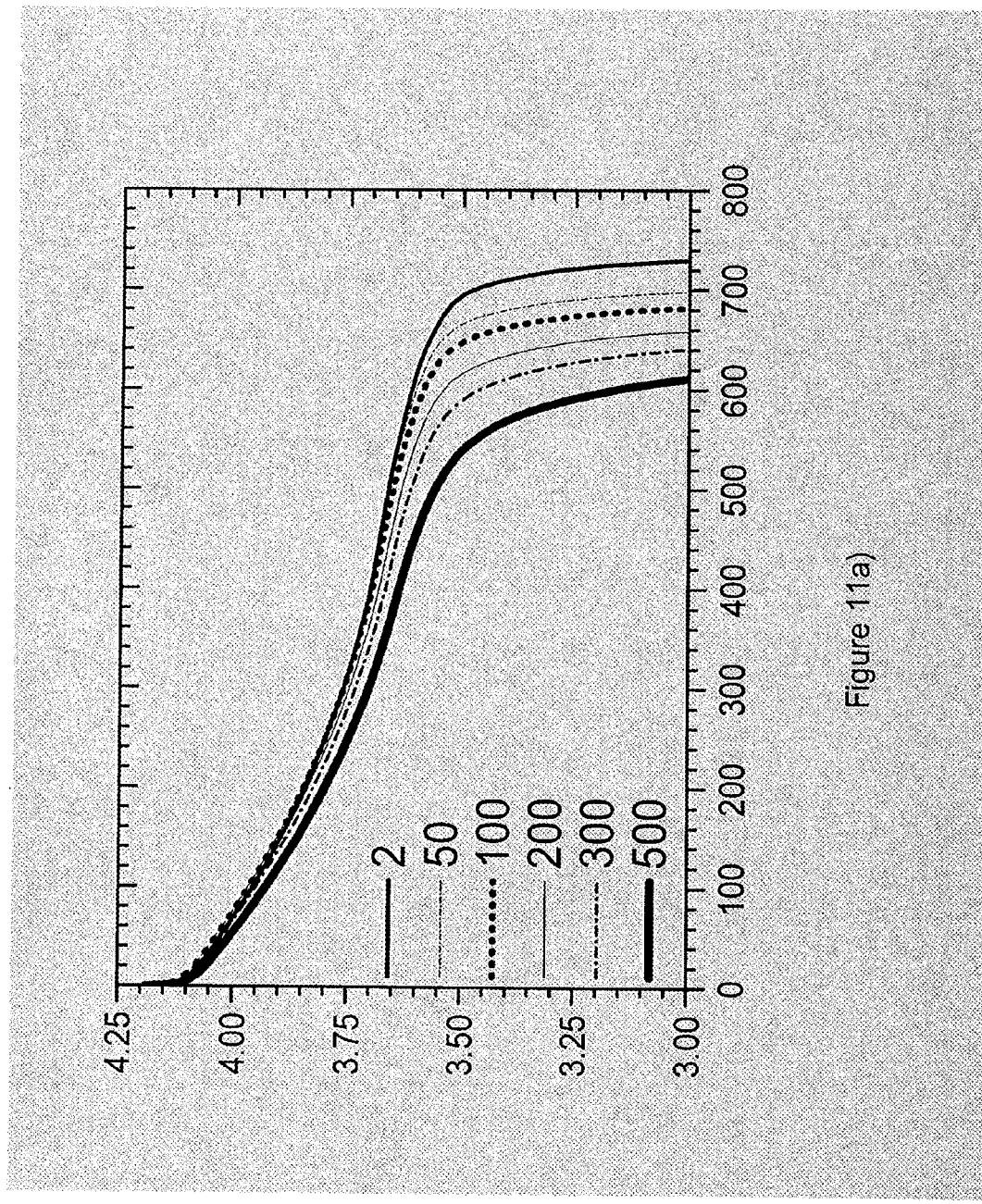

HIGH DENSITY CATHODE MATERIALS FOR SECONDARY BATTERIES

This application in a continuation-in-part of PCT/EP2010/003096, filed May 19, 2010, which claims the benefit of U.S. Provisional Application No. 61/184,441, filed Jun. 5, 2009, and European Application No. 09007465.9, filed Jun. 5, 2009, the entire contents of which are hereby incorporated by reference. This application also claims the benefit of U.S. Provisional Patent Application No. 61/435,044, filed Jan. 21, 2011, the entire contents of which are hereby incorporated herein by reference.

TECHNICAL FIELD AND BACKGROUND

The invention relates to high density cathode materials for secondary batteries, obtained by the precipitation of heterogeneous metal bearing material, that is homogeneously doped with a nanoparticle metal oxide, metal halide, metal anion, or elemental metal component.

Compared to Ni—Cd and Ni-MH rechargeable batteries, Li-ion batteries boast an enhanced energy density, mainly due to their higher 3.6 V working voltage. Since their commercialization in 1991 by SONY, Li-ion batteries have seen their volumetric energy density increase continuously. This has been initially realized by optimizing cell design, accommodating more active electrode materials in a fixed volume cell. Later efforts concentrated on improving the energy density of the electrodes. Using a high density active electrode material is another way to achieve this goal. As $LiCoO_2$ still continues to be used as positive electrode material for the majority of commercial Li-ion batteries, a highly dense variety of this material is in demand.

In WO2009/003573 such a high density $LiCoO_2$ material has been disclosed. It provides a relatively coarse-grained electrochemically active $LiCoO_2$ powder, without significant Li-excess, and having a D50 of more than 15 μm, a BET of less than 0.2 $m^2/g$. The mentioned particle size is evidently a primary particle size, and the particles are neither agglomerated or coagulated, nor aggregated.

However, this material shows various limitations in a rechargeable lithium battery. One basic limitation originates from the surface area dilemma. Increasing the rate performance (i.e. high power) can be met by increasing the surface area because the solid-state lithium diffusion length can be decreased; which results in an improved rate performance. However, a high surface area increases the area where unwanted side reactions between electrolyte and charged cathode take place. These side reactions are the reason for poor safety, poor cycling stability at elevated voltage and of poor storage properties of charged cathodes at elevated temperature. Furthermore, high surface area materials tend to have a low packing density which reduces the volumetric energy density.

Recent findings have shown that doping $LiCoO_2$ cathode materials with different elements, including but not limited to Mg, Ti, Zr, Cr, and Al, has yielded products with improved cycle life, stability, performance, and safety characteristics. The advantages of Ti doping for $LiCoO_2$ have been mentioned in U.S. Pat. No. 6,277,521.

As for most cathode materials, their preparation often makes use of a particular transition metal precursor. The precursor can then be fired with a lithium source to prepare a cathode material. It is therefore important to prepare precursors that can be easily transformed into cathode materials. It is even more beneficial if the precursors can be easily doped with other elements and that the precursor can be used to directly prepare the cathode material without additional processing steps. In WO2009/074311 various methods for preparing cathode precursor material were discussed, amongst others precipitation, coprecipitation, spray drying, spray pyrolysis, physical mixing or blending, also using slurries. All of these methods have serious problems in achieving good homogeneous doping, especially for Ti doping using a material like nanoparticles of $TiO_2$.

As initially said, an essential feature of $LiCoO_2$ is its high density. The crystallographic density is higher than other cathode materials, namely 5.05 $g/cm^3$, and $LiCoO_2$ shows a good performance even if particles are relatively large and compact. The large and compact particles pack well and thus allow to achieve electrodes with high density. High density electrodes allow to insert a larger mass of active $LiCoO_2$ into the confined space of a commercial cell. Thus a high density of $LiCoO_2$ is directly related to a high volumetric density of the final commercial lithium battery. A preferred morphology to achieve high density are compact—mostly monolithic, non-agglomerated—particles. A typical particle size (D50) is at least 10 or even 15 μm, and typically it is less than 25 μm.

There are two major preparation routes to prepare such monolithic $LiCoO_2$. In the first route a source of cobalt (like $CO_3O_4$) with relatively small particle is mixed with a source of lithium (like $Li_2CO_3$) and fired at sufficient high temperature with a sufficient excess of lithium. During sintering, the small $CO_3O_4$ particles sinter together and particles grow to the desired size distribution. In the second, alternatively route, relatively large and dense particles of a cobalt source are used. During sintering particles tend to sinter independently. There is a densification within a particle, but not much inter-particle sintering. A problem happens if applying these standard methods to prepare Ti doped $LiCoO_2$.

The first method basically results in a failure. If a mixture of $TiO_2$, small particles $CO_3O_4$ and a source of lithium is sintered, by an—to us unknown and surprising mechanism—inter-particle sintering is very much suppressed. As a result a high surface area $LiCoO_2$ consisting of heavily agglomerated particles is achieved. The preferred morphology mentioned before is only achieved after applying unrealistically high sintering temperature or much larger Li excess. Much higher sintering temperature increases the cost significantly—equipment investment, live time and energy use. Much larger Li excess results in poor performance.

The second obvious method to prepare Ti doped $LiCoO_2$ is as follows: a relatively dense cobalt precursor (like $Co(OH)_2$ with large particles size, a source of lithium (like $Li_2CO_3$) and a source of titanium (like $TiO_2$) are mixed, followed by sintering. In this case—where the $TiO_2$ is not well distributed within the particle—we observe an inhomogeneous final product. The reason is that $TiO_2$ has very poor mobility during sintering, so wherever in the mixture a few $TiO_2$ particles are agglomerated the final $LiCoO_2$ will show a region with much higher $TiO_2$ concentration. As a result, the $TiO_2$ doping with low doping level (0.1-0.5 mol %) is not efficient. At higher levels a benefit is observed, but because of the poor Ti mobility it is assumed that the inside of the $LiCoO_2$ particles is basically free of Ti and the full benefit of Ti doping cannot be achieved.

A third method to prepare high density $TiO_2$ doped $LiCoO_2$ is a two step firing. In a first firing a $LiCoO_2$ precursor with preferred morphology is prepared. This $LiCoO_2$ precursor is mixed with $TiO_2$, typically at least 0.75 mol % and less than 2 mol % (smaller doping levels are not efficient, the reason is the same as in the second method—any $TiO_2$ agglomerate will cause a $TiO_2$ enriched region resulting in a non-homogenious final $LiCoO_2$). After sintering it is assumed that the $LiCoO_2$ core is free of $TiO_2$ and the full benefit of Ti doping is not achieved.

In US2007/0264573 A1, on the other hand, an aqueous solution of Mg carbonate, Al and Ti lactate solution is mixed with a Co hydroxide slurry, and after wet ball milling the slurry is spray-dried for granulation. These precursor granules are mixed with Li carbonate and sintered at 1000° C. to obtain a Li Co—Mg—Al—Ti oxide. Since it is generally known that such a spray-drying operation is carried out at a temperature below 120° C., and since Ti lactate is a fairly stable compound that will crystallize at such temperatures— since it will only disintegrate to form Ti dioxide at temperatures over 200° C.—the spray-dried precursor does not contain $TiO_2$ in the form of nanoparticles being homogeneously distributed within the precursor.

It can further be mentioned that in CN1982219 A, a Li Co—Ni—Mn oxide doped with Al, Ti, Mg and/or Cr is obtained by co-deposition, whilst in CN101279771 A, a Mg, Al and/or Ti source are mixed in a cobalt nitrate solution which is precipitated as a doped cobalt hydroxide.

It is the scope of the present to provide for a manufacturing method for a cathode material having a high rate performance, showing high stability during extended cycling at high charge voltage, and having a particularly high pellet density. The high temperature storage properties are also to be improved.

SUMMARY

Viewed from a first aspect, the present invention can provide a lithium cobalt oxide powder for use as an active positive electrode material in lithium-ion batteries, the lithium cobalt oxide powder having a Ti content of between 0.1 and 0.25 mol %, and the lithium cobalt oxide powder having a density PD in $g/cm^3$ dependent on the powder particle size expressed by the D50 value in µm, wherein PD≥3.63+ [0.0153*(D50−17)]. In one embodiment, the lithium cobalt oxide powder has a D50 between 10 µm and 25 µm, and a specific surface area (BET) of less than 0.25 $m^2/g$. In another embodiment, the lithium cobalt oxide powder has a D50 between 15 µm and 25 µm, and a specific surface area (BET) of less than 0.20 $m^2/g$. In yet another embodiment, the lithium cobalt oxide powder further comprises Mg as doping element with a Mg content between 0.1 and 2 mol %.

BRIEF INTRODUCTION TO THE DRAWINGS

Figures 2A, 2B:
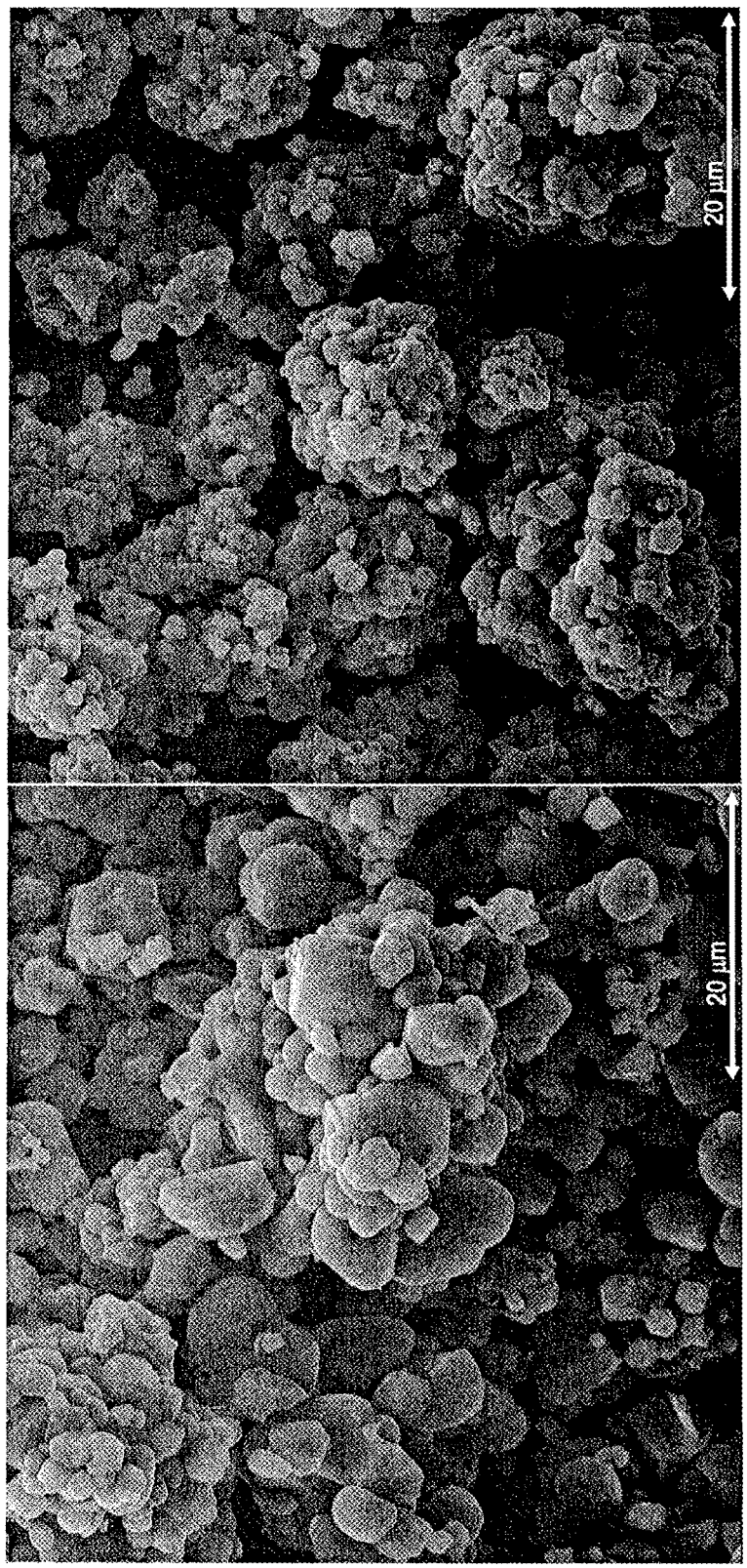
Figures 3A, 3B:
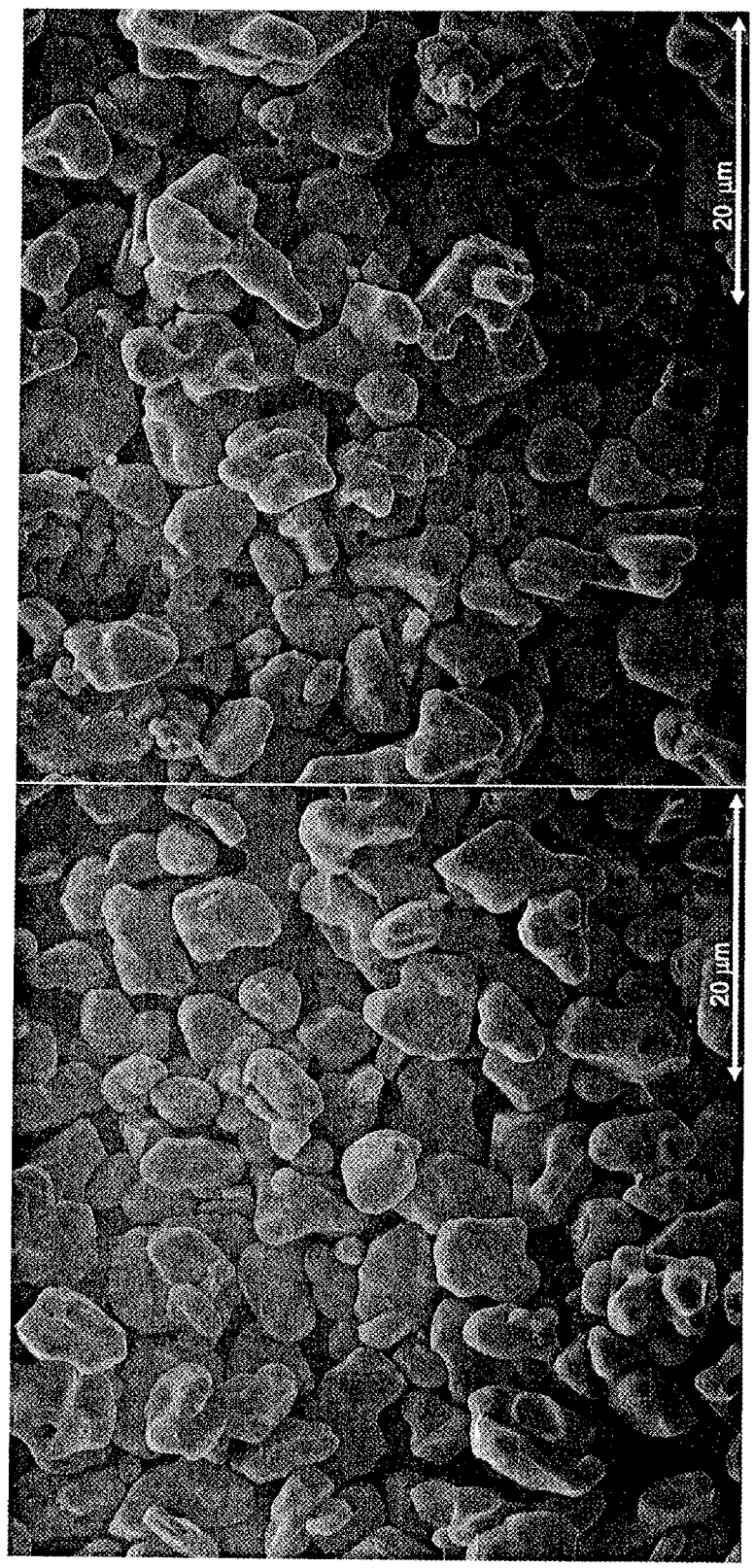
Figures 6A, 6B:
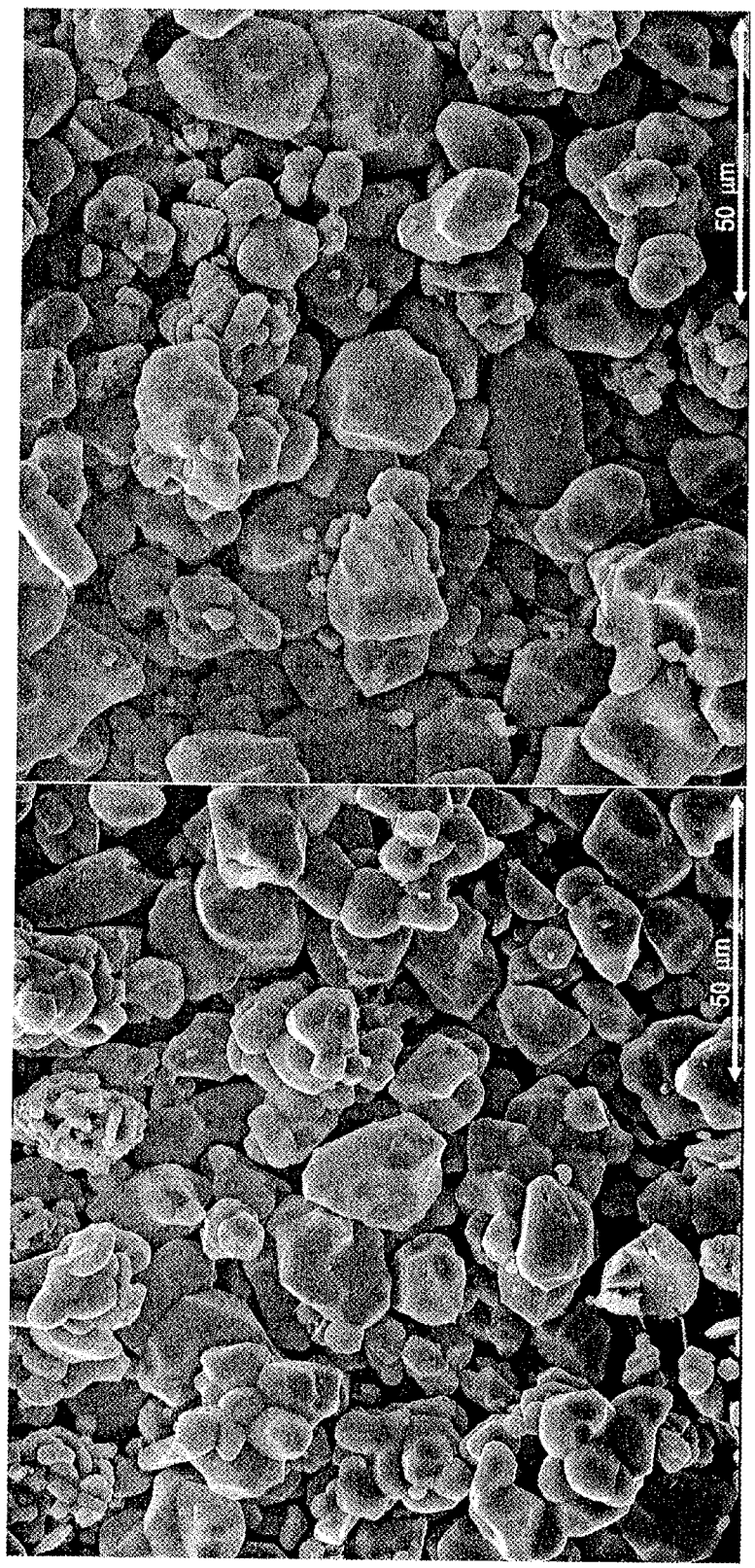
Figure 10:
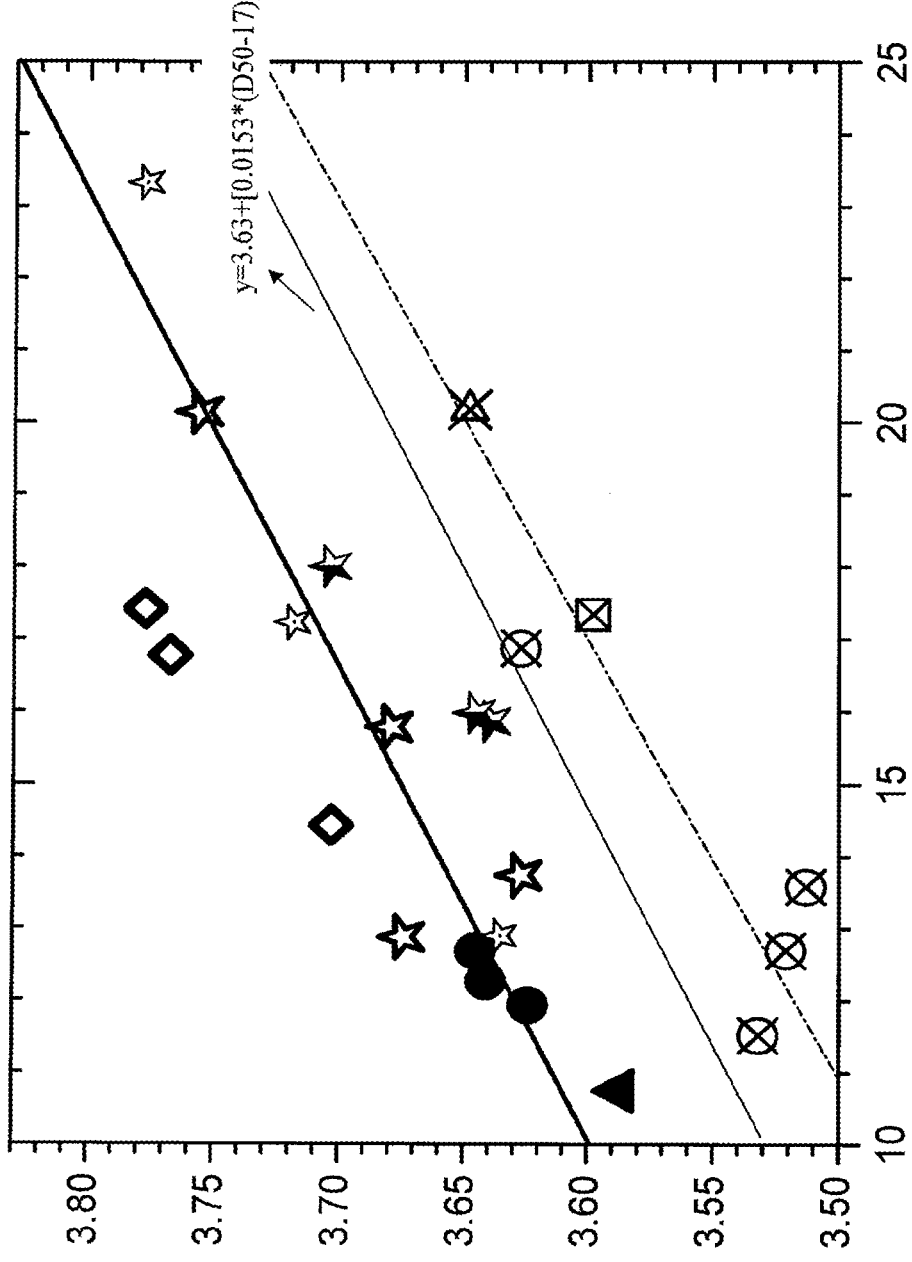

FIGS. 1a & b: SEM micrograph (2000× magnification) of samples with 0.25 mol % Ti and 0.5 mol % Mg: FIG. 1a: sample LC0193 (left) and FIG. 1b: LC0227 (right);

FIG. 2a & b: SEM micrograph (5000× magnification) of samples with 0.75 mol % Ti and 0.5 mol % Mg: FIG. 2a: sample LC0199 (left) and FIG. 2b: LC0233 (right);

FIG. 3: SEM micrograph of samples without Ti and with 0.5 mol % Mg: sample LC0190 (left) and LC0223 (right);

FIG. 4: Electrochemical performance of undoped $LiCoO_2$: sample LC0189. Left: discharge profiles at different rates (from left to right:) 3C, C (discharge in 1 hr), C/2, C/10 (each time showing voltage (V) against cathode capacity (mAh/g)); middle: stability (voltage (V) against capacity (mAh/g)— from right to left: Cycle 7, 31 (both at C/10), 8, 32 (both at 1C)); right: fade (capacity (mAh/g) against cycle number— line with circles: charge; line with stars: discharge);

FIG. 5: Electrochemical performance of $LiCoO_2$ with 0.25 mol % Ti: sample LC0192 (experiments as described in FIG. 4);

FIG. 6a & b: SEM micrograph (2000× magnification) of samples with 0.25 mol % Ti and varying Mg: FIG. 6a: sample LC0322 (left) and FIG. 6b: LC0329 (right);

FIG. 7: Electrochemical performance of $LiCoO_2$ with 0.25 mol % Ti: sample LC0322 (experiments as described in FIG. 4);

FIG. 8: Electrochemical performance of $LiCoO_2$ with 2 mol % Mg and 0.25 mol % Ti: sample LC0329 (experiments as described in FIG. 4);

FIG. 9a & b (top and bottom): Electrochemical performance of $LiCoO_2$ with 0.2 mol % Ti: samples LC0315 (FIG. 9a) and LC0316 (FIG. 9b) (experiments as described in FIG. 4);

FIG. 10: Pellet density ($g/cm^3$) as a function of mean particle size D50 (µm); and FIG. 11a & b: Discharge voltage profiles during extended cycling at 1C (cell voltage against capacity): 11a: sample LC0214 (0.25 mol % Ti); 11b: sample LC0207 (no Ti). For each from right to left: cycles 2, 50, 100, 200, 300 & 500.

DETAILED DESCRIPTION

The cathode materials for secondary batteries described before can exhibit an increased stability besides high capacity and energy density, and they can also meet the necessary power requirements, which means that the active cathode material itself and the battery as a whole have a sufficient high rate performance.

An important aspect of the invention is that it can use precursors of a new type of nanoparticle doped precipitate, that are disclosed in co-pending application PCT/EP2010/ 003096. In that sense, a method to incorporate a dopant into a material in which it is usually not stable is provided. The method is able to dope precipitated materials with insoluble dopants including, such as, but not limited to MgO, $Cr_2O_3$, $ZrO_2$, $Al_2O_3$, or $TiO_2$ and any general metal oxide, metal halide, metal compound, or elemental metal nanoparticle.

Because, for example, $TiO_2$ is well dispersed within the secondary particles of the precursor compound the diffusion length is short and the cathode material for secondary batteries prepared with this precursor, such as $LiCoO_2$, is homogeneous. No region rich in $TiO_2$ is detected when analyzing with EDX. Because of the well distributed Ti already small doping amounts of 0.1-0.25 mol % give the full benefit of Ti doping. Furthermore, by a mechanism that is not yet fully understood—it is surprisingly observed that small Ti doping levels cause a significant increase of pellet density of the doped $LiCoO_2$. This is a highly desired effect because it allows an increase in the volumetric energy density of commercial lithium batteries. Other particular aspects, such as superior rate capability and better stability at high voltage, are illustrated below.

An example of a process used for homogeneously distributing the particulate dopant material in the host materials which are the precursors mentioned before, being composed of primary particles agglomerated into secondary particles, can comprise the steps of:

providing a first flow comprising a solution of a precursor of the host material, providing a second flow comprising a precipitation agent, providing a third flow comprising a complexing agent, providing a quantity of insoluble particulate dopant material, either in one or more of said first, second and third flows, or in a fourth flow consisting of a suspension of said particulate dopant material, and mixing said first, second and third flow, and, if present, said fourth flow, thereby precipitating said host material and said dopant. This process was already detailed in WO2009-074311.

In this example process, the solution of the precursor is preferably an aqueous metal salt solution, and also the suspension of the dopant material is a suspension in water comprising a suspension stabilizing agent. In one embodiment, the particulate dopant material consists of stabilized nanoparticles, such as metals or metal oxides, and the precursor is either one or a mixture of a metal nitrate, chloride, halide, and sulphate powder. In another embodiment, the dopant material is either one or more of $MgO$, $Cr_2O_3$, $ZrO_2$, $Al_2O_3$, and $TiO_2$, and has a size range of $\geq 5$ nm and $\leq 200$ nm.

As said before, in the example synthesis procedure, a feed of insoluble metal oxide nanoparticles can be introduced during the precipitation of a metal hydroxide or oxyhydroxide. It is also possible to introduce the metal oxide nanoparticles into a reactor along with a metal salt solution, an alkaline earth hydroxide, and a complexing agent. In one embodiment, at least two flows of reactants are added to a reactor. At least one of the flows contains a basic composition like NaOH and/or $NH_4OH$, forming the anion of the precipitate to be obtained, and another flow contains dissolved metal like $CoSO_4$, forming the cation of the precipitate. During the addition of the flows to the reactor, dopant nano-sized particles are present in the reactor. These nanoparticles are preferably added directly to the reactor or alternatively are fed into any one of the flows, for example in the form of a dispersed solution containing the nanoparticles, but the addition can also be in the form of a fine powder. A possible process to dope the precursor with Mg is to provide for a $CoSO_4$ solution containing the Mg (as $MgSO_4$) in the desired quantities.

Hence, the following example supply flow schemes to the reactor can be observed:

(1) Flow 1: precipitation agent (e.g., NaOH), Flow 2: host material solution (e.g., Mg doped $CoSO_4$), Flow 3: solution of a complexing agent (e.g., $NH_3$), Flow 4: Nano dispersion of dopant (e.g., $TiO_2$)

(2) Flow 1: precipitation agent (e.g., NaOH), Flow 2: host material solution (e.g., Mg doped $CoSO_4$), Flow 3: solution of a complexing agent (e.g., $NH_3$), Nanoparticles: add as a powder to one of the flows or to the mixture of one or more of the Flows 1, 2, 3

(3) Nanoparticles are dispersed in the "starting water" or "starting ammonia" in the reactor, Flow 1: precipitation agent (e.g., NaOH), Flow 2: host material solution (e.g., Mg doped $CoSO_4$), Flow 3: solution of a complexing agent (e.g., $NH_3$).

After reaction, the precipitated slurry is collected and filtered and the solid is washed with water and then dried to yield metal hydroxide particles doped with nanoparticles. If the precipitate or transition metal ions become oxidized during the reaction or during one of the other processing steps, an oxyhydroxide or oxide of some other chemical composition is obtained.

The choice of a soluble metal salt is not restrictive. Soluble metal salts, including nitrates, chlorides, halides, and sulphates may also be used, depending on the application. For the precipitating agents, besides NaOH, for example LiOH, KOH, carbonate, and oxalate salts, may also be used to precipitate the metal salt out of its solution. Complexing agents are, for example, chosen from soluble amine salts or molecules, including but not limited to $NH_3$, ethylene diamine tetra-acetate salts, urea, or other known complexing agents. The precipitated host material, for example $Co(OH)_2$, is usually a hydroxide, but could also be another metal hydroxide, oxide, oxyhydroxide, oxycarbonate, carbonate, or oxalate precipitate that is co-precipitated with the dopant nanoparticles.

The nanoparticle of choice can be of an appropriate size so that it is possible for it to fit among the primary particles of the host material. In one example there is provided a sufficiently small nanoparticle to allow the nanoparticle to become embedded throughout the $Co(OH)_2$ particle. In one embodiment the size of the nanoparticle is less than 200 nm and larger than 10 nm, but nanoparticles of larger or smaller size may be acceptable depending on the composition and morphology of the composite particle required. In general, smaller nanoparticles could be advantageous if deep diffusion into the core of the particle is envisaged.

The choice of nanoparticle focuses on appropriate size and on the fact that it will not dissolve appreciably, or that it is highly insoluble in the reaction mixture or feed solution that the nanoparticle comes in contact with.

In an embodiment of the process, a stabilized aqueous solution of $TiO_2$ nanoparticles, an aqueous solution of cobalt sulphate, caustic, and aqua ammonia are introduced into a stirred and heated reactor and the precipitated material is collected. Thus, crystalline $TiO_2$ doped $Co(OH)_2$ is prepared as a Co precursor for the high-density lithium cobalt oxide powder.

The reaction can be typically performed using continuous precipitation in an overflow reactor and can be controlled by adjusting and monitoring the pH throughout the experiment. Experiments may also be performed without pH control, by adjusting the feed rates of the reactants. Another possible reaction configuration can be carried out using an autoclave reactor or a batch reactor. The continuous precipitation process is for example performed between 20° C. and 90° C., but higher or lower temperatures can also be used. An example solvent for the reaction is water, but other solvents, for example glycols, alcohols, acids, and bases can also be used.

In another example reaction, the pH (temperature uncompensated) is controlled between values of 10.4 to 11.3, or even between 10.8 and 11.0. In general, a higher pH will result in the precipitation of smaller secondary particles, while a lower pH will result in the precipitation of larger secondary particles. The resulting $TiO_2$ doped $Co(OH)_2$ can have D50 particle size volume distribution values between 5-50 μm and spans ranging from 0.5 to 2.0. In one example, the steady state production of $TiO_2$ doped $Co(OH)_2$ can result in D50 particle sizes ranging from 6-21 μm with spans ranging from 0.9 to 1.3. The span is defined as being (D90–D10)/D50.

The primary platelet sizes of the precipitated $TiO_2$ doped $Co(OH)_2$ can range from 10 nm to 2000 nm, with typical primary platelet sizes being for example between 50-400 nm. The tap density of the $TiO_2$ doped $Co(OH)_2$ can range from 0.7-1.5 g/cm$^3$ and is for example between 1.2-1.5 g/cm$^3$. In general, larger $TiO_2$ doped $Co(OH)_2$ secondary particles and primary particle thicknesses can give higher tap densities. The apparent density of this material can range from 0.3-1.2, for example with typical values of 0.8-1.2 g/cm$^3$.

The precipitated $TiO_2$ doped $Co(OH)_2$ powder is for example a composite of two separate phases: one of $TiO_2$ and one of $Co(OH)_2$. The composite particles can usually be composed of collections of primary particles of $Co(OH)_2$, with thicknesses that can be between 20-500 nm, for example between 50-200 nm. Interdigitated and embedded between the primary platelets of $Co(OH)_2$ are the $TiO_2$ nanoparticles. The $TiO_2$ is embedded throughout the $Co(OH)_2$ particle and is not solely on the surface of the particle.

The composite secondary particles typically can have a D50 range between 1-50 μm and more typically between 5-25

μm. It is during the precipitation that the PSD is typically controlled, although precipitated material can also be prepared using a gel preparation and then processed to a smaller size. Other processing methods, including grinding, milling, or other attrition techniques, may be used to prepare particles of appropriate size.

With the example aggregated precursor, using a suitable blending ratio of Li to Co, and a single firing step, the primary particles in the end product grow larger, while there is little change in secondary particle size. Under certain conditions, such as with a blending ratio of Li to Co between 1.04 and 1.07, and a firing temperature in the range of 960 to 1020° C., the primary particles forming the secondary structure can indeed grow together. In this way, and by using aggregated $Co(OH)_2$, the final lithium cobalt oxide powder can be prepared cost effectively.

The invention may be illustrated by the following experimental details:

Preparation of Mg and/or Ti Doped Precipitated Hydroxide

A series of in total 12 cobalt hydroxide based precursors are prepared in a small pilot plant continuous precipitation line using the process described above. A flow of $TiO_2$ nanoparticles is continuously fed into the rector, and at the same time Mg-doped Co-sulfate solution, sodium hydroxide solution and $NH_4OH$ are added continuously to the reactor. Precipitated samples are collected after reaching steady state. Each preparation takes more than one week. After sampling the cobalt based hydroxide is washed and dried. The intention of this series is to prepare precursors with similar morphology but different doping. $TiO_2$ doping levels (per 1 mol Co) range from 0 to 0.75 mol %. Mg doping levels per mol Co vary between 0 and 2 mol %.

ICP elemental analysis confirms that the targeted composition is achieved for all of these samples. Great care is taken to ensure that the morphology of all these precursors is very similar. All precursors have a tap density ranging from 1.35-1.45 $g/cm^2$ and the D50 (particle size distribution, wet method) of 17-21 μm. Morphology, checked by SEM, looks very similar, showing irregular secondary particles consisting of slightly coarse primary plate-shaped particles. The $TiO_2$ containing samples have the $TiO_2$ well distributed within the secondary particles.

The preparation is also suitable for providing $Cr_2O_3$, $ZrO_2$, or $Al_2O_3$ doped precipitated hydroxide.

Preparation of Mg and/or Ti Doped $LiCoO_2$

More than 36 final $LiCoO_2$ base samples are prepared from these precursors as follows:

The cobalt hydroxide based precursor is mixed with fine $Li_2CO_3$ particles, then fired in dry air at 1015° C., followed by milling and sieving. Typical sample size is 1 kg. The Li:Co molar blend ratio varies from 1.04 to 1.07.

The final samples are investigated by particle size analysis (PSD, dry method), BET surface area, SEM microscopy, coin cell testing, pH titration and pellet density. Selected samples are further tested by elemental analysis (ICP), full cell testing (commercial size Li polymer cells, including safety tests, storage tests and cycling stability test), electrode density, EDX cross section, DSC safety estimation etc.

Particle size distribution of $LiCoO_2$ is measured using laser diffraction. A standard analysis of laser diffraction particle analysis assumes that the particles which created the diffraction pattern are spheres with various volumes. The "D50" is the median size-volume distribution, i.e., particles with smaller size contribute 50% to the total volume. Correspondingly, "D10" and "D90" are the size where smaller particles contribute 10% or 90% to the total volume. The specific surface area of $LiCoO_2$ is measured with the Brunauer-Emmett-Teller (BET) 5 point method using a Micromeritics Tristar.

Pellet density is measured as follows: 3 g of powder is filled into a press form with a diameter of 1.292 cm. Pressure (2.8 t) is applied for 30 sec, whereupon the powder sample thickness is measured. By knowing its pressed volume and weight the pellet density is calculated.

Electrochemical performance is tested in coin type cells, with a Li foil as counter electrode in a lithium hexafluorite ($LiPF_6$) type electrolyte at 25° C. Cells are charged to 4.3 V and discharged to 3.0 V to measure rate performance and capacity. The capacity retention during extended cycling is measured at 4.5V charge voltage. Specific capacity of 160 mAh/g is assumed for the determination of the discharge rates. For example, for discharge at 2 C, a specific current of 320 mA/g is used.

Rate capability is measured at different discharge rates (as in FIG. 4, left):

Cycle 1: C/10, 2: C/5, 3: C/2, 4: 1C, 5: 2C, 6: 3C (1C=160 mA/g)

For stability and fade measurements (as in FIG. 4, middle and right), the cycling procedure is continued as follows:

Cycle 7: C/10
Cycle 8: 1C
Cycles 9 to 30: cycled at C/4 charge and C/2 discharge at 4.5-3.0 V
Cycle 31: C/10
Cycle 32: 1C Good materials should at least have the following properties:

BET: Small BET surface area, typically below 0.25 or even 0.2 $m^2/g$

SEM: Preferred are powders comprising dense, compact, monolithic secondary particles—thus avoiding excessive agglomerates Coin cell testing showing:
(a) high rate performance
(b) rectangular shape of discharge profile at higher rate
(c) small change of voltage profile after extended cycling at 4.5V
(d) high capacity retention during extended cycling stability at 4.5V
Pellet density: as high as possible
PSD: no excessive number of large or small particles, or Low span (=(D90–D10)/D50) and monomodal PSD.

The surprising discovery is made that very small amounts of titanium (much below 0.5 mol %) dramatically improve the performance (pellet density, rate performance, cycling stability) without sacrificing any other positive property. Also, if the Ti doping level exceeds 0.5 mol %, then it is impossible to obtain the preferred morphology. The particles have high BET surface and are strongly agglomerated. We furthermore discovered that the benefit of Ti is completely independent of magnesium doping level.

Generally, the best performance is achieved with 0.25 mol % $TiO_2$ doping or less. In the presence of $TiO_2$, introducing additional magnesium doping causes a small decrease of capacity without losing rate performance, but gaining in safety performance.

The preparation is also suitable for providing $Cr_2O_3$, $ZrO_2$, or $Al_2O_3$ doped $LiCoO_2$ particles.

In the following aspects of the invention are described by examples:

Example 1

Two cobalt hydroxide precursors, doped with 0.5 mol % Mg and containing 0.25 mol % dispersed $TiO_2$ nanoparticles are used to prepare 6 final $LiCoO_2$ based samples.

The sintering temperature is 1015° C., and the Li:Co molar ratio of the blend is varied between 1.04 and 1.07. Note that this ratio does not correspond to the true Li:Co ratio of the final sample (which is smaller by about 2-4%).

Table 1 summarizes the obtained results:

| Sample info | | Physical | | PSD | | Coin Cell (Half Cell) Testing: | | Rate (versus 0.1C) | | |
|---|---|---|---|---|---|---|---|---|---|---|
| Sample | Li:Co blend | BET m²/g | PD g/cm³ | D50 μm | SPAN | DC Q mAh/g | Qirr % | 1C (%) | 2C (%) | 3C (%) |
| LC0191 | 1.04:1 | 0.234 | 3.627 | 13.74 | 1.71 | 157.89 | 0.84 | 95.47 | 93.47 | 92.20 |
| LC0226 | | 0.233 | 3.635 | 12.90 | 1.46 | 157.92 | 2.58 | 95.23 | 93.07 | 91.84 |
| LC0192 | 1.055:1 | 0.207 | 3.679 | 15.79 | 1.44 | 156.21 | 3.21 | 94.32 | 91.84 | 90.02 |
| LC0227 | | 0.195 | 3.718 | 17.23 | 1.32 | 155.23 | 3.71 | 92.92 | 89.91 | 87.77 |
| LC0193 | 1.07:1 | 0.176 | 3.755 | 20.14 | 1.42 | 154.90 | 4.46 | 92.44 | 89.26 | 87.13 |
| LC0228 | | 0.171 | 3.777 | 23.33 | 1.25 | 153.63 | 4.60 | 91.12 | 87.26 | 84.57 |

PD: pellet density;
DC Q: discharge capacity;
Qirr (irreversible capacity) = $[Q_{Charge} - Q_{DC}]/Q_{Charge}$ (in %) of the first cycle, measured at C/10 rate.

All samples have excellent performances. The BET decreases with particle size, and the pellet density increases. Particularly LC0227 and LC0193 are of interest. They offer the best compromise between desired particle size, good electrochemical performance and very high pellet density. FIG. 1 shows the SEM micrograph of samples LC0227 and LC0193. We observe quite compact particles with some edges and faces. This morphology is especially preferred to obtain high density.

Counterexample 2

Two cobalt hydroxide precursors, doped with 0.5 mol % Mg, containing 0.75 mol % dispersed $TiO_2$ nanoparticles are used to prepare 6 final $LiCoO_2$ based samples. Sintering conditions are as in Example 1.

Table 2 summarizes the obtained results:

| Sample info | | Physical | | PSD | | Coin Cell (Half Cell) Testing: | | Rate (versus 0.1C) | | |
|---|---|---|---|---|---|---|---|---|---|---|
| Sample | Li:Co blend | BET m²/g | PD g/cm³ | 50 μm | SPAN | DC Q mAh/g | Qirr % | 1C (%) | 2C (%) | 3C (%) |
| LC0197 | 1.04:1 | 0.399 | na | 11.18 | 1.88 | 158.80 | 0.84 | 98.26 | 97.37 | 96.64 |
| LC0232 | | 0.543 | na | 11.93 | 1.86 | 157.89 | 2.55 | 98.04 | 96.73 | 95.69 |
| LC0198 | 1.055:1 | 0.313 | na | 10.96 | 1.74 | 157.55 | 1.96 | 97.54 | 96.26 | 95.24 |
| LC0233 | | 0.428 | na | 12.58 | 1.83 | 157.84 | 2.48 | 98.17 | 97.06 | 96.27 |
| LC0199 | 1.07:1 | 0.342 | na | 10.75 | 2.04 | 157.61 | 2.17 | 96.55 | 95.13 | 93.96 |
| LC0234 | | 0.320 | na | 13.49 | 1.88 | 157.31 | 2.62 | 97.59 | 96.16 | 95.17 |

The main difference with the 0.25 mol % Ti doped samples of Example 1 is that the BET is very large, and the particle size much smaller. With increasing Li:Co, the BET does not decrease much, and the particle size increases insignificantly. Pellet density could not be measured reliable, because of strong agglomeration, as will be discussed next.

FIG. 2 shows the SEM micrograph of 2 typical samples, LC0199 and LC0233. Note that the magnification is different from FIG. 1. Obviously, the morphology of these samples, doped with 0.75 mol % Ti is very different from the 0.25 mol % doped samples. The first are strongly agglomerated, with small primary crystallites ranging from sub-micrometer to 5 μm, the latter are large and compact, primary crystallites have about 5-20 μm size. The strong agglomeration is the reason that pellet density could not be measured reliable, simply because the agglomerates are braking under the applied force, giving results that are much too high for the given morphology.

6 more samples are prepared using 0.5 mol % Mg doped Cobalt hydroxide, additionally containing 0.5 mol % Ti. The results are in between those of Example 1 and Counterexample 2, showing clearly more agglomerated, lower density and higher BET than those of Example 1.

It is concluded that doping of $LiCoO_2$ with more than about 0.25 mol % Ti is undesired.

Counterexample 3

Two cobalt hydroxide precursors, doped with 0.5 mol % Mg and without containing dispersed $TiO_2$ nanoparticles are used to prepare 6 final $LiCoO_2$ based samples. Sintering conditions are as in Example 1.

Table 3 summarizes the results:

| Sample info | | Physical | | | | Coin Cell (Half Cell) Testing: | | | | |
|---|---|---|---|---|---|---|---|---|---|---|
| | | | | PSD | | | | Rate (versus 0.1C) | | |
| Sample | Li:Co blend | BET m²/g | PD g/cm³ | D50 µm | SPAN | DC Q mAh/g | Qirr % | 1C (%) | 2C (%) | 3C (%) |
| LC0188 | 1.04:1 | 0.260 | 3.532 | 11.52 | 1.44 | 158.81 | 0.84 | 97.10 | 95.30 | 93.58 |
| LC0223 | | 0.174 | 3.598 | 17.34 | 1.19 | 156.29 | 3.44 | 93.22 | 90.44 | 88.58 |
| LC0189 | 1.055:1 | 0.216 | 3.513 | 13.58 | 1.28 | 158.10 | 2.76 | 95.37 | 93.25 | 91.65 |
| LC0224 | | 0.133 | 3.734 | 26.02 | 1.31 | 152.94 | 5.37 | 90.75 | 87.12 | 84.83 |
| LC0190 | 1.07:1 | 0.178 | 3.627 | 16.87 | 1.23 | 156.69 | 3.72 | 93.74 | 91.04 | 89.18 |
| LC0225 | | 0.110 | 3.805 | 34.66 | 1.20 | 150.53 | 6.47 | 88.75 | 84.34 | 81.65 |

The main difference with Example 1, at similar particle size, is to be found in a much lower pellet density. FIG. 3 shows the SEM micrograph of samples LC0190 and LC0223. The particles are compact, the particle size is comparable, but compared with 0.25 mol % Ti of Example 1, the shape is very different. The shape is more round and sometimes concave. This morphology is less preferred and results in a much lower pellet density for an identical size.

Furthermore, the rate performance and stability of 0.25 mol % Ti doped samples of Example 1 is superior. The numeric values are not so different, but a careful look at the voltage profiles during cycling and rate performance shows very clear differences. FIG. 4 (LCO189) shows the performance of a typical undoped sample and compares with a 0.25% mol Ti doped sample (see FIG. 5 (LCO192)). Both samples have quite similar key parameters (PSD, BET, . . . ). The profile of 0.25 mol % Ti doped samples, especially at high rate, is much more rectangular—more steep at the end of discharge—and it remains more rectangular during cycling, whereas undoped samples show a clear deterioration of discharge voltage profile. A decrease in fading rate for the 0.25 mol % doped samples is also observed, whereas the $TiO_2$ free sample continues to lose capacity. We conclude that $LiCoO_2$ without the inventive Ti doping has less cycle stability and lower rate performance.

Example 4

Two cobalt hydroxide precursors, undoped or doped with 2 mol % Mg, and also containing 0.25 mol % dispersed $TiO_2$ nano particles, are used to prepare 12 final $LiCoO_2$ samples. Sintering conditions are as in Example 1.

Table 4 summarizes the results.

All samples exhibit a high pellet density. All samples showed a similar sintering behavior to those of Example 1. FIG. 6 (SEM of samples LC0322 & 329) shows that excessive agglomerated morphology, observed for larger Ti doping as in Counterexample 2 is absent. The morphology is quite similar to those of Example 1. FIG. 7 (LCO322) and 8 (LCO329) show a similar cycling performance as observed in Example 1. We conclude that Mg content has very little influence on the morphology. Typical is the rectangular voltage at higher rate, remaining rectangular also after extended cycling. The reversible capacity, however, decreases slightly with increasing Mg doping—this is generally observed for Mg doped LCO.

Counterexample 5

A cobalt hydroxide precursor, doped with 2 mol % Mg and containing 0.5 mol % dispersed $TiO_2$ nanoparticles is used to prepare 3 final $LiCoO_2$ samples. The preferred morphology—as described in Ex. 1—is not obtained. The samples show excessive agglomeration, similar to Counterexample 2. Counterexample 5 confirms that a well-controlled Ti doping level is important for morphology, but Mg doping is not.

Counterexample 6

0.20 mol % Ti (as $TiO_2$) is added to a $LiCoO_2$ sample having preferred morphology. The $TiO_2$-dry coated $LiCoO_2$ is heated at 1015° C. in air, resulting in samples LC0315 & 316. Pellet density did not increase. Samples of Example 1 or 4 have—at similar particle size—significantly higher pellet

| Sample info | | | Physical | | | | Coin Cell (Half Cell) Testing: | | | | |
|---|---|---|---|---|---|---|---|---|---|---|---|
| | Comment | | | | PSD | | | | Rate (versus 0.1C) | | |
| Sample | Mg mol % | Li:Co Blend | BET m²/g | PD g/cm³ | D50 µm | SPAN | DC Q mAh/g | Qirr % | 1C (%) | 2C (%) | 3C (%) |
| LC0321 | 0 | 1.04 | 0.221 | 3.703 | 14.43 | 1.67 | 158.91 | 2.34 | 97.08 | 95.29 | 93.85 |
| LC0322 | | 1.055 | 0.194 | 3.767 | 16.77 | 1.50 | 157.78 | 3.21 | 95.15 | 92.64 | 90.79 |
| LC0323 | | 1.07 | 0.188 | 3.777 | 17.41 | 1.47 | 157.33 | 3.37 | 94.65 | 92.04 | 90.09 |
| LC0191 | 0.25 | 1.04 | 0.234 | 3.627 | 13.74 | 1.71 | 157.89 | 2.43 | 95.47 | 93.47 | 92.20 |
| LC0192 | | 1.055 | 0.207 | 3.679 | 15.79 | 1.44 | 156.21 | 3.21 | 94.32 | 91.84 | 90.02 |
| LC0193 | | 1.07 | 0.176 | 3.755 | 20.14 | 1.42 | 154.90 | 4.46 | 92.44 | 89.26 | 87.13 |
| LC0226 | | 1.04 | 0.233 | 3.635 | 12.90 | 1.46 | 157.92 | 2.58 | 95.23 | 93.07 | 91.84 |
| LC0227 | | 1.055 | 0.195 | 3.718 | 17.23 | 1.32 | 155.23 | 3.71 | 92.92 | 89.91 | 87.77 |
| LC0228 | | 1.07 | 0.171 | 3.777 | 23.33 | 1.25 | 153.63 | 4.60 | 91.12 | 87.26 | 84.57 |
| LC0327 | 2.0 | 1.04 | 0.203 | 3.639 | 15.87 | 1.50 | 154.73 | 4.85 | 93.99 | 91.72 | 89.95 |
| LC0328 | | 1.055 | 0.199 | 3.645 | 15.98 | 1.49 | 153.82 | 5.42 | 92.62 | 90.13 | 88.28 |
| LC0329 | | 1.07 | 0.176 | 3.703 | 18.00 | 1.30 | 152.06 | 6.73 | 90.77 | 87.66 | 85.65 | density. FIGS. 9a (LC0315) and 9b (LC0316) show that the voltage profile is much less rectangular than that of samples of Example 1 and 4. This Counterexample shows that Ti needs to be finely dispersed within the precursor. If it is added on the outside of the sample a much higher Ti doping is needed before a clear beneficial effect is observed.

Counterexample 7

This example shows that Ti doped $LiCoO_2$— prepared from a standard precursor different from the composite material of this patent—involves severe problems. The precursor is $CO_3O_4$, doped with 1 mol % magnesium per 1 mol cobalt, $Li_2CO_3$ (same batch like used for all other examples and counter examples, and $TiO_2$ sub-micrometer powder (uncoated pigment).

First, a well-homogenized pre-blend containing a fraction of the $CO_3O_4$ and all $TiO_2$ (the $TiO_2$ is carefully pre-dried), is prepared, this blend is added to the remaining $CO_3O_4$ and $Li_2CO_3$ and blending is continued. The final blend does not contain any visible agglomerates of $TiO_2$ or $Li_2CO_3$. The final blend contains 0.25 mol % $TiO_2$ per 1 mol Co.

A total of 4 blends with Li:Co ratios ranging from 1.054 to 1.072 are used, firing at 1000° C. results in Ti+Mg doped $LiCoO_2$. The obtained particle size is significantly smaller (10-15 µm) than expected for similar Li:Co blend ratios without $TiO_2$. As a comparison—using the same $CO_3O_4$ precursor, the same firing conditions and the same Li:Co blend ratios yields particle sizes ranging from 24-35 µm. This shows that it is not possible to obtain a preferred morphology (PSD of 10-20 µm) without using excessive high Li:Co blend ratios or excessive high sintering temperature.

Particle size results are summarized in the following Table 5:

| Sample info | | PSD Laser diffraction (dry, H2O) | | | | | | | |
|---|---|---|---|---|---|---|---|---|---|
| Sample | Li:Co (mol) | <1 µm (%) | <3 µm (%) | Dmin µm | D10 µm | D50 µm | D90 µm | D100 µm | Span |
| LC0345 | 1.054 0.25 mol % | 0.00 | 0.12 | 2.91 | 5.58 | 10.59 | 19.95 | 44.81 | 1.36 |
| LC0346 | 1.058 Ti | 0.00 | 0.00 | 3.48 | 6.43 | 12.25 | 23.26 | 52.31 | 1.37 |
| LC0347 | 1.068 | 0.00 | 0.00 | 3.48 | 6.43 | 12.25 | 23.26 | 52.31 | 1.37 |
| LC0348 | 1.072 | 0.00 | 0.00 | 3.48 | 6.43 | 12.25 | 23.26 | 52.31 | 1.37 |
| LC0181 | 1.052 No | 0.00 | 0.43 | 2.04 | 11.88 | 23.77 | 43.25 | 71.23 | 1.32 |
| LC0182 | 1.057 Ti | 0.00 | 0.00 | 8.48 | 15.12 | 27.69 | 48.65 | 81.81 | 1.21 |
| LC0163 | 1.068 | 0.00 | 0.23 | 2.43 | 19.05 | 35.73 | 61.19 | 96.41 | 1.18 |
| LC0164 | 1.072 | 0.00 | 0.15 | 2.91 | 20.79 | 36.52 | 60.29 | 96.36 | 1.08 |

The underlying mechanism is possibly the following: $TiO_2$ is very efficient to prevent sintering by inter particle sintering, as a result there is less growth of particle size. Thus—in order to obtain Ti doped $LiCoO_2$ with preferred morphology—i.e., having larger and compact particles requires that the $TiO_2$ is finely dispersed within larger sized precursor particles, as described in this invention.

Example 8

A large number of hydroxide precursors with different doping levels of Mg and different amounts of added Ti are prepared at a small pilot plant line. The Mg content (mols per 1 mol of cobalt) ranges from 0 to 2.0 mol %. The Ti content (mol Ti per 1 mol of Co) ranged from 0% to 0.75%. The sample size is about 5-10 kg. From each precursor 3 blends with different Li:Co stoichiometric ratio, ranging from 1.04 to 1.07 ratio are obtained. The blends are fired (tray loading=1.5 kg) in a pilot plant furnace or in a chamber furnace in air at 1000° C. After firing the sintered cake is broken using a jawcrasher and milled with a hammer mill, followed by sieving with a 53 µm mesh. PSD is measured by laser diffraction in a jet of air. If the D50 of the PSD for is smaller than 10 µm then an additional sample with higher Li:Co blend ratio is prepared. The pellet density is measured if the final sample has a D50 of the PSD larger than 10 but less than 25 µm.

FIG. 10 shows the pellet density PD of doped $LiCoO_2$ as function of particle size D50. The samples on the upper thick line have Mg contents from 0 to 2 mol %, and Ti content of 0.25 mol % (the data are given in Table 4). The samples on the lower dotted line (the symbols are crosses) have a Ti content of 0 (some data from Table 3), 0.5 and 0.75 mol %, and 0.5 to 2 mol % Mg. No sample without titanium has a sufficient high pellet density. Of the samples with high pellet density only those with 0.25 mol % precursor doping have a preferred morphology. Example 8 clearly shows the benefit of titanium doping for obtaining increased pellet density.

The graph shows a linear fit (thick line) of the pellet density PD as function of D50 of the PSD (particle size distribution) for the samples with 0.25 mol % Ti doping. The fit equation is density (PD)=PD17+m*(D50−17) where PD17 (the value for D50-17 µm) is 3.706 (g/cm³) and m=0.0153 (g/(cm³×µm)). In the present invention it is possible to achieve a density of at least 3.63 g/cm³ for a powder with D50=17 µm and having a Ti content between 0.1 and 0.25 mol %. Based on the linear fit described before, for powders with that Ti content it is possible to obtain a PD≥3.63+[0.0153*(D50−17)].

Example 9

The large pool of samples with 0% Ti doping and 0.25 mol % Ti doping are analyzed in order to understand how to prepare basically identical samples (morphology, PSD, lithium:Co ratio, BET, . . . ) mainly differing by Ti content only. Additionally, the Ti doped sample has a significantly higher pellet density.

Table 6 summarizes the properties.

| | Preparation | | | Physical | | | | PSD RTC Dry | | | | | | | |
|---|---|---|---|---|---|---|---|---|---|---|---|---|---|---|---|
| Sample | Ti mol % | Li:Co Blend | T sint °C. | BET m²/g | Tap g/cm³ | Pellet g/cm³ | H2O ppm | <1% | <3% | Dmin μm | D10 μm | D50 μm | D90 μm | D100 μm | Span |
| LCO207 | 0.0 | 1.055 | 1005 | 0.255 | 2.40 | 3.521 | 80.00 | 0.00 | 0.98 | 1.42 | 5.99 | 12.70 | 24.6 | 46.1 | 1.46 |
| LCO214 | 0.25 | 1.045 | 1015 | 0.276 | 2.43 | 3.674 | 90.00 | 0.00 | 3.67 | 1.42 | 4.47 | 12.88 | 28.9 | 60.5 | 1.89 |

Figure 11B:
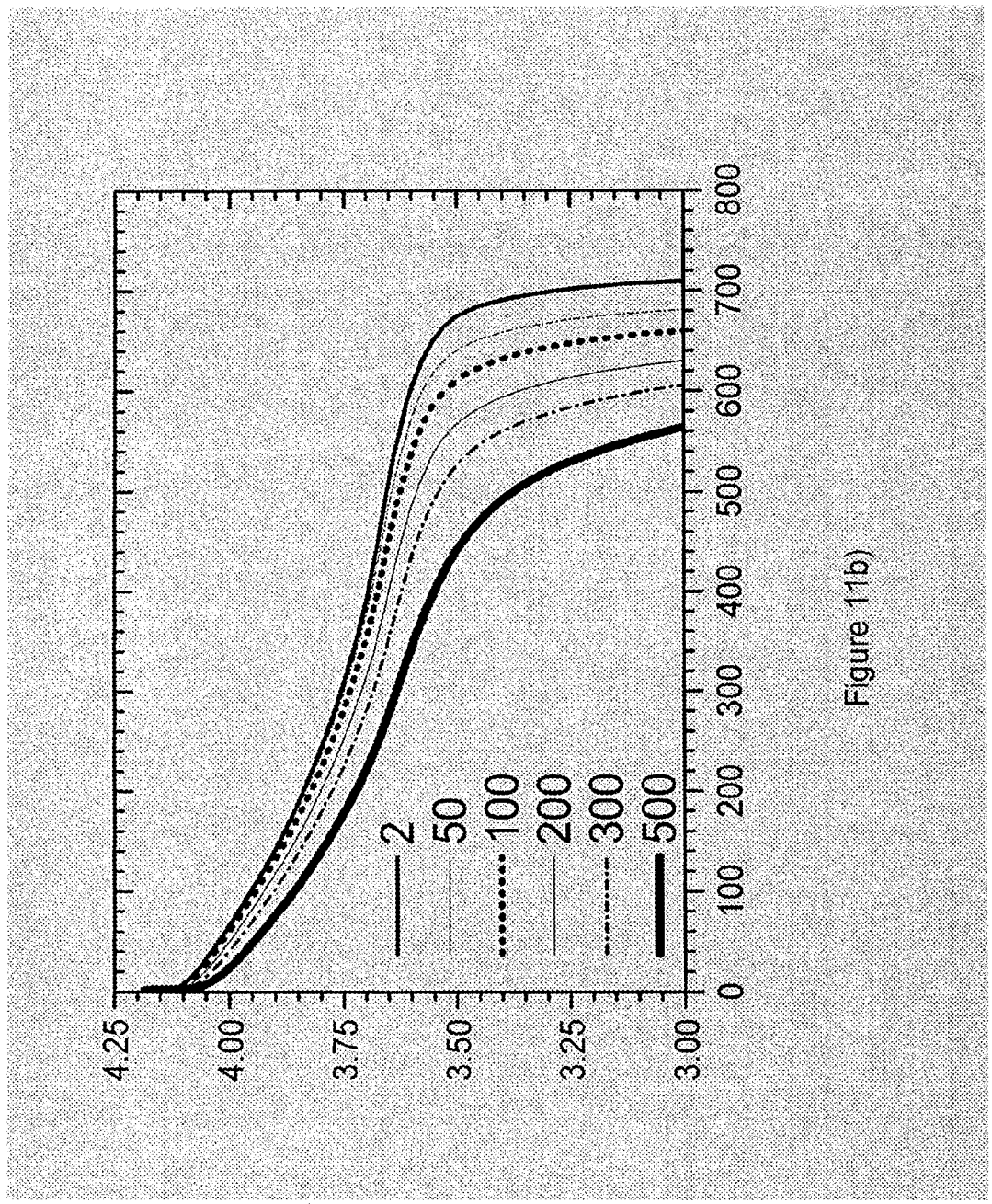

Full cells testing shows a clearly improved stability of the Ti doped sample during extended cycling (>500 cycles). The $TiO_2$ doped sample, compared with an undoped reference, shows clearly less voltage depression (=unwanted impedance), especially at the beginning of discharge. At the same time, the capacity fading rate is clearly improved. FIGS. 11a and b illustrate this, for resp. Samples LCO 214 and 207.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

The invention claimed is:

1. A lithium cobalt oxide powder for use as an active positive electrode material in lithium-ion batteries, the lithium cobalt oxide powder having a Ti content of between 0.1 and 0.25 mol %, and the lithium cobalt oxide powder having a pellet density (PD) in g/cm³ dependent on the powder particle size expressed by the D50 value in μm, wherein $PD \geq 3.63+[0.0153*(D50-17)]$.

2. The lithium cobalt oxide powder of claim 1, having a D50 between 10 μm and 25 μm, and a specific surface area (BET) of less than 0.25 m²/g.

3. The lithium cobalt oxide powder of claim 2, having a D50 between 15 μm and 25 μm, and a specific surface area (BET) of less than 0.20 m²/g.

4. The lithium cobalt oxide powder of claim 1, further comprising Mg as doping element with a Mg content between 0.1 and 2 mol %.

* * * * *